United States Patent

Almond et al.

[15] 3,687,552

[45] Aug. 29, 1972

[54] DEVICE FOR CONTACTING AND EXPOSING SENSITIZED ELEMENTS

[72] Inventors: Robert James Almond, Holmdel; Edward Francis Hagan, Old Brdige, both of N.J.

[73] Assignee: E. I. du Pont de Nemours and Company, Wilmington, Del.

[22] Filed: Sept. 17, 1971

[21] Appl. No.: 181,446

[52] U.S. Cl. .......................355/113, 355/91, 355/99

[51] Int. Cl. .............................................G03b 27/04

[58] Field of Search....355/113, 84, 91, 97, 122, 123, 355/127, 128, 129, 131, 99, 93

[56] References Cited

UNITED STATES PATENTS 3,313,225 4/1967 Mears......................355/91 X

*Primary Examiner*—Samuel S. Matthews
*Assistant Examiner*—Richard L. Moses
*Attorney*—William R. Moser

[57] ABSTRACT

A device for holding in optical contact a photographic transparency and a sensitized element, having a pressure frame and an exposure frame. The pressure frame has a plurality of wheels disposed in columns on rows of shafts in a pattern to provide uniform exposure of all areas of the sensitized element to a source of actinic radiation, and to hold the transparency in optical contact with the sensitized element, when the exposure frame is affixed to the element and transported through the pressure frame.

The device is useful for uniformly exposing a series of sensitized elements conveyed in a continuous web and for exposing individual sensitized elements.

9 Claims, 7 Drawing Figures

INVENTORS

EDWARD F. HAGAN
ROBERT J. ALMOND

BY William R. Moser

ATTORNEY

INVENTORS
EDWARD F. HAGAN
ROBERT J. ALMOND
William R. Moser
ATTORNEY

INVENTORS
EDWARD F. HAGAN
ROBERT J. ALMOND

BY William R. Moser
ATTORNEY

DEVICE FOR CONTACTING AND EXPOSING SENSITIZED ELEMENTS

BACKGROUND OF THE INVENTION

1. Field of the Invention

This invention relates to image reproduction devices and more particularly to image reproduction devices using photoresist material as the image reproducing medium.

The device is particularly useful for practicing the processes of Assignee's patent to Celeste, U.S. Pat. No. 3,469,982 and patent application, Celeste et al., Ser. No. 684,945, filed Nov. 22, 1967.

2. Description of the Prior Art

Assignee's patent to Cohen et al., U.S. Pat. No. 3,547,730 discloses an integrated machine for automatically preparing resist images on sensitized elements using an intermittent exposure device.

The present invention provides for continuous exposure of the sensitized elements with a stationary exposure unit, thereby eliminating the handling problems associated with intermittent exposure and obviating the need for a traveling exposure unit. Proper registration and optical contact are achieved with the combination of an exposure frame and a pressure frame.

SUMMARY OF THE INVENTION

A device for holding in optical contact a photographic transparency and a sensitized element and exposing said element to actinic radiation comprising:

a. a source of actinic radiation within a housing, b. an exposure frame having at least one transparent plate with registration pins for holding a photographic transparency in registration with a sensitized element, c. a pressure frame, having cooperating frame members with columns of wheels disposed in rows on shafts across the width of the pressure frame, and having means for urging said cooperating frame members against said exposure frame and holding said transparency in optical contact with the sensitized element in said exposure frame, and d. means for conveying said exposure frame containing said transparency and sensitized element in registration, through said cooperating frame members during exposure to said source of actinic radiation.

The apparatus is useful for practicing the processes of Assignee's afore-mentioned patent U.S. Pat. No. 3,469,982 where, on imagewise exposure to actinic radiation, a photosensitive composition forms soluble and insoluble areas, and for practicing the process of Assignee's patent application, Ser. No. 684,945 filed Nov. 22, 1967, where, on imagewise exposure to actinic radiation, a photosensitive composition forms hardened and unhardened areas and delamination of an integral receptor sheet at a temperature above 45° C. causes the unhardened areas of the composition to fail cohesively leaving the unhardened material adhering to the element and the hardened material adhering to a receptor sheet.

The advantages of this invention are that it provides for continuous exposure and high throughput of sensitized elements while insuring optical contact of the transparencies and sensitized elements, without the need for a traveling exposure unit.

BRIEF DESCRIPTION OF THE DRAWINGS

A device embodying the invention is described herein with reference to the attached drawings, wherein the same numbers are used throughout, in which.

DESCRIPTION OF THE PREFERRED EMBODIMENT

Figure 1:
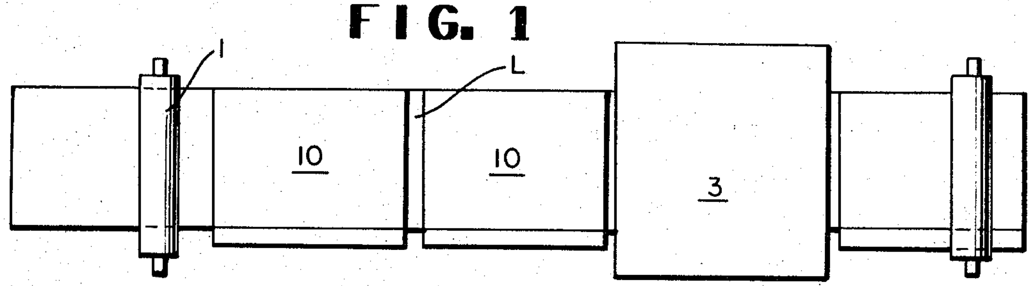
FIG. 1 is a plan view of an embodiment of the invention.
Figure 2:
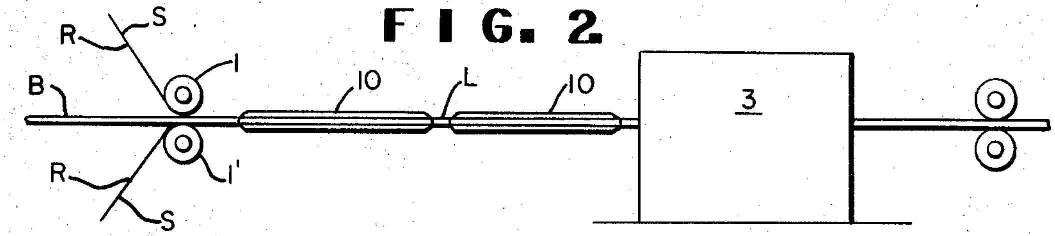
FIG. 2 is an elevation view of an embodiment of the invention.
Figures 3, 4:
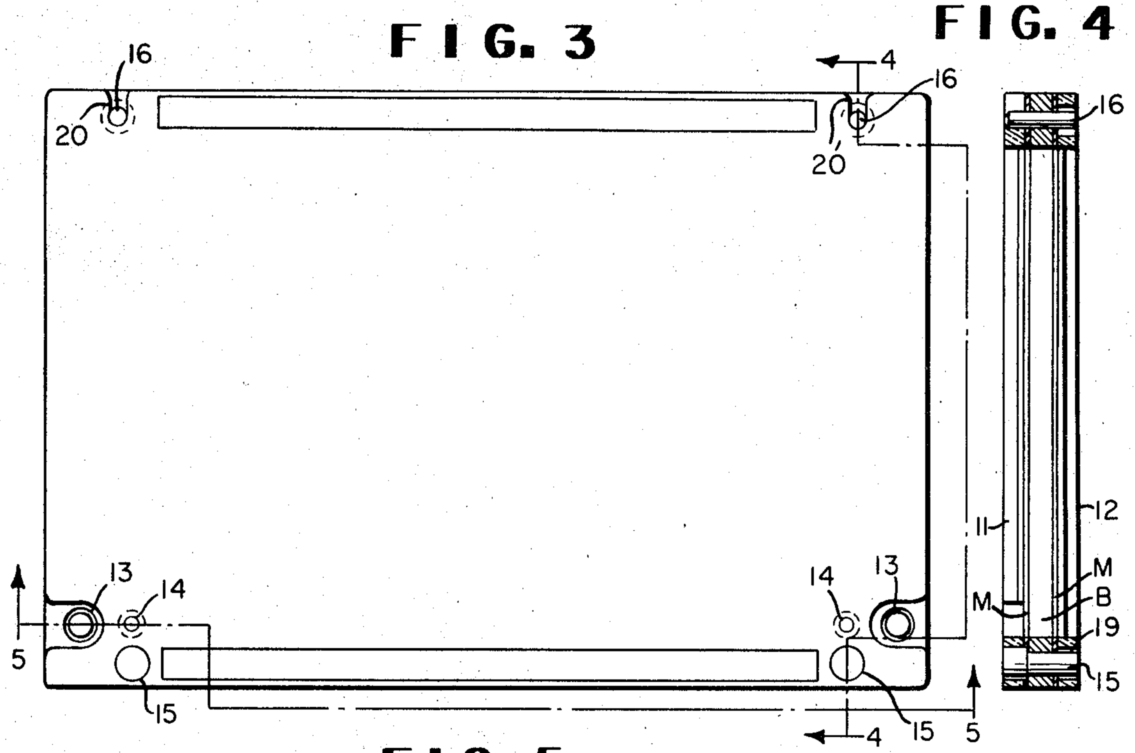
FIG. 3 is a plan view of an exposure frame of an embodiment of the invention.
FIG. 4 is an elevation view section taken along lines 4 — 4 of FIG. 3.
Figure 5:
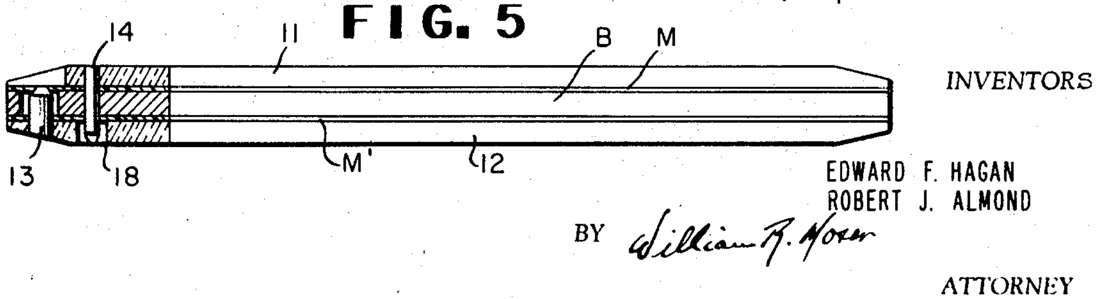
FIG. 5 is an elevation view in partial section taken along lines 5 — 5 of FIG. 3.
Figure 6:
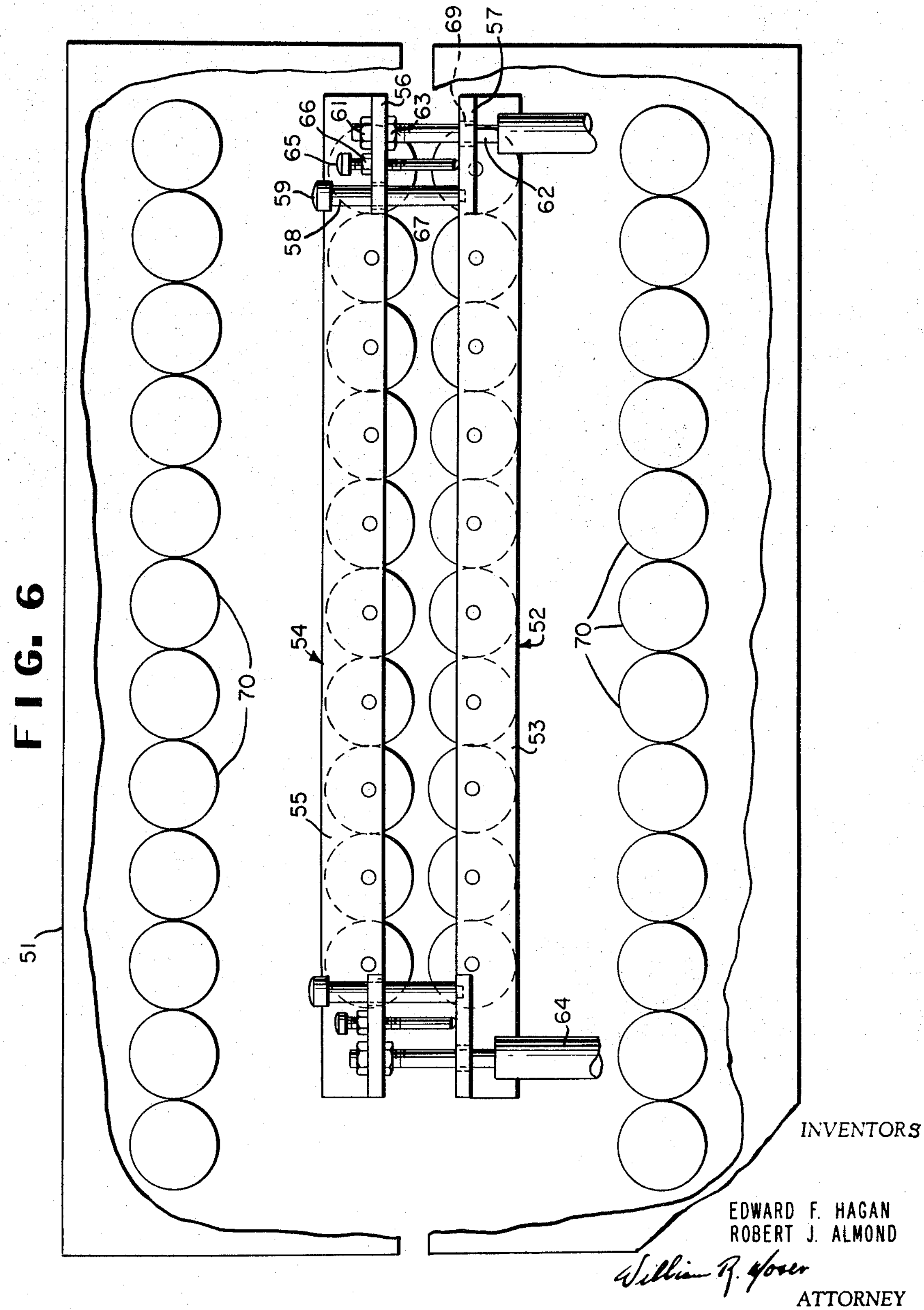
Fig. 6 is an elevation view in partial section of the exposure unit of an embodiment of the invention.

In the embodiment of the invention shown in the attached drawings, an article B, e.g., a copper plated, glass fiber laminated board, such as used for the manufacture of printed circuits, is fed to laminating rolls between an upper and lower support S with a resist layer R laminated on the support surface which comes in contact with the article. The support S with laminated resist layer R is laminated to upper and lower surfaces of the article B by rolls 1 and 1' to form a sensitized element in a laminate L. The laminate L is continuously fed to an exposing unit 3. The exposure frame 10 is manually affixed to laminate L with transparencies M and M' in registration with the article B, and enters the exposure unit 3. The pressure frame in the exposure unit provides optical contact between the transparencies and the sensitized element in said exposure frame when said exposure frame is passed through the pressure frame. The length of exposure can be varied by varying the speed of the laminate through the exposure unit.

The exposure frame 10 comprises upper and lower transparent plates 11 and 12, which may be formed of an actinic radiation transmitting material, e.g., UV transmitting optical grade poly(methyl methacrylate) or glass. The plates should be of sufficient thickness to provide suitable rigidity and strength, e.g., 3/16 inch. Registration pins 14 are provided in the upper plate 11 for registering the upper transparency M with the article B and guide holes 18 in the lower plate 12. Registration pins 13 are provided in the lower plate 12 for registration of the lower transparency M' to plate 12. Registration pins 15 in the upper plate 11 are provided to register upper plate 11 with registration holes 19 in lower plate 12 and the lower transparency M' with the article B. Pins 16 are provided to facilitate positioning of upper plate 11 with lower plate 12. Magnetic strips 17 are disposed along the side edges of upper plate 11 opposite metal keeper strips (not shown) in the lower plate to hold the exposure frame in place before entering the pressure frame. Alternatively, the exposure frame may be hinged along one side edge, and use a magnetic fastener strip along the other side edge. A polypropylene hinge has been found particularly suitable for this purpose.

In a single-sided exposure frame a compressible foam material, e.g., closed cell neoprene, may be disposed on the surface of the nonexposure side to improve optical contact of the transparency with the sensitized element in the exposure frame. Preferably, the exposure frame has upper and lower transparent plates as shown and transparencies are placed on both sides of the element.

The pressure frame is disposed in a suitable housing 51, and comprises cooperating frame members 54 and 52. The lower member 52 is disposed in the exposure unit housing 51 on rigid supports (not shown). Upper and lower frame members 52 and 54 have flange brackets 56 and 57 at each end of side rails 55, 55' and 53, 53', respectively. The frame members are urged together against the exposure frame between them by air pistons of equivalent means. In the illustrated embodiment, air pistons 64 are mounted at each corner of frame 52 on side rails 53, 53'. Piston shafts 62 operably connect the upper and lower frame members. The piston shafts 62 are secured to flange 56 by nut 61 and lock nut 63. The piston shafts are free to travel in hole 69 in flange 57 of the lower frame 52. Guide pin 58 with cap 59 is disposed in guide hole 67 of flange 56 and press fitted in flange 57 of the lower frame 52. Stand off screw 65 is thread mounted in flange 56 and adjustable by lock nut 66.

Figure 7:
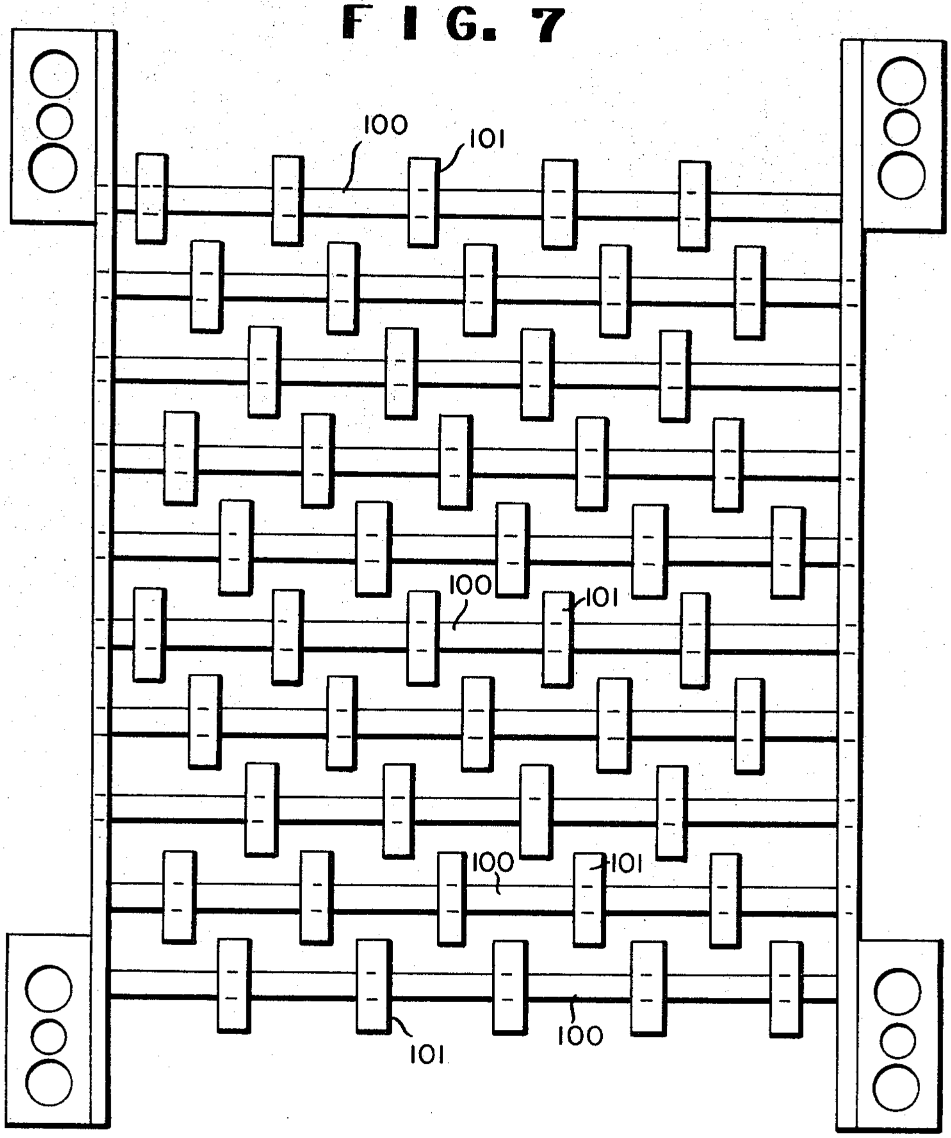
FIG. 7 is a plan view of one of the frame members of the pressure frame.

Rows of shafts 100 having columns of wheels 101 are disposed between the side rails of individual frame members 52 and 54. The basic pattern for the location of wheels W in columns on the rows of shafts can be defined in matrix notation as follows, where subscripts indicate matrix row and column:

$$\begin{matrix} O & W_{12} & O & O & O \\ O & O & O & W_{24} & O \\ W_{31} & O & O & O & O \\ O & O & W_{43} & O & O \\ O & O & O & O & W_{55} \end{matrix}$$

for the frame of FIG. 7. The overall layout of wheels comprises repetitions of the basic pattern defined by such a matrix. For example, in FIG. 7 the pattern is repeated five times between the side rails of the frame and twice between the leading and trailing edges of the frame. Any variation of wheel locations in the matrix defining the basic repeating pattern is suitable, with the restriction that only a single wheel be present in each of the columns and the wheels have a width approximately equal to the width of the columns of the matrix defining the repeating pattern. Uniform exposure of all areas of the sensitized element is provided as equal areas of the element are masked from the actinic radiation source by the same number of wheels, in each column as the element is conveyed through the pressure frame and exposed.

The basic repeating pattern may be defined by a matrix of virtually any dimension, but a pattern defined by a matrix in the range 4 × 4 to 7 × 7 is preferred. This range is preferred due to the exposure area required for a reasonably short path length, and the distance between contact wheels required to insure optical contact between the transparencies and sensitized element in the exposure frame. The exposure area in the pressure frame may be increased by increasing the spacing between rows of shafts. For example, a frame using a 4 × 4 matrix repeating pattern and 2 inch diameter wheels on ¾ inch shafts with 4 inch shaft spacing has been used to produce optical contact and provides approximately 74 percent exposure area within the pressure frame. Matrix patterns of 4 × 4 or less require shaft spacing greater than the diameter of the wheels to maintain the column alignment of wheels and insure uniform exposure of the sensitized element as it is conveyed through the exposure unit.

The wheels may be disposed on the shafts with individual ball-bearing mounts or the shafts may be rotatably journaled in bearing in the side rails.

The sensitized elements may be conveyed in web form as a laminate as shown in FIG. 1, or alternatively individual sensitized elements may be conveyed through the exposure unit in an exposure frame by driving the shafts synchronously, e.g., with a chain drive, sprockets and an electric motor.

Exposure lamps 70 are disposed in housing 51 for exposing the elements to actinic radiation. Suitable fluorescent lamps or other actinic light sources may be used.

The exposure time may also be varied by selectively switching fluorescent lamps off along the length of the exposure unit or by varying the length of the exposure unit.

The apparatus may be equipped with a pre-heater to heat the resist-coated web prior to lamination and delamination. The laminating rolls may be heated to provide proper lamination temperatures or heated laminating shoes may be used. The delaminating rolls may also be heated rolls. The laminating and delaminating rolls may be equipped with individual or synchronous variable speed motor controls, and may be journaled on brackets which are in turn mounted on air pistons for raising and lowering the upper or lower roll to facilitate threading the flexible support and clearing jams. Reversing drive motors may be used for driving the laminating and delaminating rolls. Additional rolls are also provided for peeling a protective cover sheet from the coated resist layer R as shown in U.S. Pat. No. 3,547,730, the disclosure of which is incorporated by reference herein. Means for feeding articles to the laminating rolls as described in that patent may also be included.

The exposure unit is provided with a hinge and fastener (not shown) to facilitate access to the pressure frames for threading the web, clearing jams, routine adjustments and maintenance of components.

The operation of the exposure unit can be readily understood with reference to the attached drawings. An article B is fed into the laminating rolls with the resist coated flexible support S on either or both sides of the article and they are laminated to form a sensitized element. On emergence from the laminating rolls the exposure frame is manually affixed to the laminate over the sensitized element and held in place by the magnetic strips and metal keeper strips. The standoff screws between the upper and lower members are preadjusted to allow the tapered leading edge of the exposure frame to enter the pressure frame. The thicker main portion of the pressure frame is conveyed into the pressure frame, displacing the upper frame from the standoff screws and transferring the force applied by the air pistons to the exposure frame through the wheels in the upper and lower pressure frame members. Optical contact is provided between the transparencies and the sensitized elements in the exposure frame as it is conveyed through the pressure frame and exposed to actinic radiation from the lamps.

Although the invention has been described with particular reference to a preferred embodiment other embodiments are contemplated. In particular, the exposure unit is not limited to operation with elements in a continuous web, but is also operable on individual elements in an exposure frame by conveying the exposure frame through the pressure frame using fixed wheels on shafts and driving the shafts with a chain drive and sprockets.

I claim:

1. A device for holding in optical contact a photographic transparency and a sensitized element and exposing said element to actinic radiation comprising:

a. a source of actinic radiation within a housing, b. an exposure frame having at least one transparent plate with registration pins for holding a photographic transparency in registration with a sensitized element, c. a pressure frame, having cooperating frame members with columns of wheels disposed in rows on shafts across the width of the pressure frame, and having means for urging said cooperating frame members against said exposure frame and holding said transparency in optical contact with the sensitized element in said exposure frame, and d. means for conveying said exposure frame containing said transparency and sensitized element in registration, through said cooperating frame members during exposure to said source of actinic radiation.

2. A device as recited in claim 1, wherein the sensitized elements are conveyed on a continuous web, and said means for conveying the sensitized elements is a pair of coacting nip rolls, at least one of which is a driven roll, disposed subsequent to said cooperating frame members, for conveying the sensitized elements through said cooperating frame members by pulling the continuous web.

3. A device as recited in claim 2, wherein said coacting nip rolls are heated rolls for delaminating the continuous web from the sensitized elements, some or all of the photoresist material remaining laminated to the boards.

4. A device as recited in claim 2, including another pair of coacting nip rolls, disposed previous to said cooperating frame members, for laminating photoresist material to an article to form a sensitized element.

5. A device as recited in claim 1, wherein said cooperating frame members have an identical number of wheels in each column to provide uniform exposure to all areas of the sensitized element as it is conveyed through said cooperating frame members in registration with the photographic transparency in said exposure frame and exposed to actinic radiation.

6. The device of claim 1 wherein said exposure frame has upper and lower transparent plates with registration pins for holding transparencies in registration with said element.

7. The device of claim 1 wherein said exposure frame has a single transparent plate on one side and a compressible foam material on the other side.

8. The device of claim 1 wherein said transparent plate is poly(methyl methacrylate) or glass.

9. The device of claim 1 wherein said means for urging said cooperating frame members comprises a plurality of air pistons.

* * * * *